(12) United States Patent
Echezuria et al.

(10) Patent No.: US 6,491,100 B2
(45) Date of Patent: Dec. 10, 2002

(54) DISPOSAL OF FLUIDS BY DISPLACEMENT INJECTION IN SHALLOW SOILS

(75) Inventors: Heriberto Echezuria, Mirauda (VE); Pedro Vasquez, Edhiranda (VE); Jose De Aguiar, Caracas (VE); Juan F. Urich, Maturin (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 09/730,926

(22) Filed: Dec. 6, 2000

(65) Prior Publication Data

US 2002/0066567 A1 Jun. 6, 2002

(51) Int. Cl.⁷ .................................................. B09B 3/00
(52) U.S. Cl. ............................... 166/305.1; 405/129.15; 405/53
(58) Field of Search ................................. 166/270, 268, 166/305.1; 405/128.25, 129.15, 267, 53, 55

(56) References Cited

U.S. PATENT DOCUMENTS

| | | | | |
|---|---|---|---|---|
| 3,606,925 A | * | 9/1971 | Poettmann | 166/305.1 |
| 4,309,129 A | * | 1/1982 | Takahashi | 405/267 |
| 4,540,316 A | * | 9/1985 | Takahashi | 106/697 |
| 5,139,365 A | * | 8/1992 | Chesner | 405/129.15 |
| 5,318,382 A | * | 6/1994 | Cahill | 405/129.4 |
| 5,387,737 A | * | 2/1995 | Schmidt et al. | 166/305.1 |
| 5,405,224 A | * | 4/1995 | Aubert et al. | 166/308 |
| 5,463,164 A | * | 10/1995 | Perkins | 166/305.1 |

* cited by examiner

Primary Examiner—David Bagnell
Assistant Examiner—David P Stephenson
(74) Attorney, Agent, or Firm—Bachman & LaPointe, P.C.

(57) ABSTRACT

A method for disposing of a fluid includes the steps of obtaining a fluid; positioning a well into a saturated soil; and pumping the fluid into the well whereby the fluid displaces saturated soil away from the well so as to form a fluid zone in the saturated soil for storing the fluid.

5 Claims, 3 Drawing Sheets

DISPOSAL OF FLUIDS BY DISPLACEMENT INJECTION IN SHALLOW SOILS

BACKGROUND OF THE INVENTION

The invention relates to a method for disposing of fluids and, more particularly, to a method for disposing of fluids or slurries such as drilling cuts or used drilling fluid, in shallow soils, which method is suitable to be applied in ecologically sensitive areas.

Subterranean wells are drilled for various purposes. One common goal is to drill to formations which contain hydrocarbons, so that such hydrocarbons can be produced and refined and/or sold as valuable products. Drilling of such wells is frequently accomplished utilizing known or conventional drilling equipment and drilling fluid which is circulated through the hole being drilled to the drill bit and back to the surface. Typical drilling fluids return to the surface carrying various cuttings and other materials encountered during the drilling. These materials are sometimes difficult to dispose of. This is particularly the case in environmentally or ecologically sensitive areas.

It is clear that the need remains for a method for disposing of such materials which results in safe, long-term confinement of such materials, without damaging or contaminating the area in which the material is disposed, and without the need for costly transport of the material to other sites.

It is therefore the primary object of the present invention to provide a method for disposal of such materials.

It is a further object of the present invention to provide a method for disposal of such materials which can be readily accomplished with available equipment and minimal expense.

It is another object of the invention to provide such a method wherein the fluid needs no special treatment prior to disposal.

Other objects and advantages of the present invention will appear hereinbelow.

SUMMARY OF THE INVENTION

In accordance with the present invention, the foregoing objects and advantages have been readily attained.

According to the invention, a method is provided for disposing of a fluid, which method comprises the steps of obtaining a fluid; positioning a well into a saturated soil; and pumping said fluid into said well whereby said fluid displaces saturated soil away from said well so as to form a fluid zone in said saturated soil for storing said fluid.

The method of the present invention is ideally suited for disposal of any type of flowable fluid including slurries and the like, one example of which is drilling cuts or used drilling fluid.

In accordance with a preferred embodiment, the method further comprises the steps of monitoring pressure, for example in said fluid zone, during said pumping step, and stopping said pumping step when certain pressure conditions are detected and/or when the storing capacity of the soil is reached.

BRIEF DESCRIPTION OF THE DRAWINGS

A detailed description of preferred embodiments of the invention follows, with reference to the attached drawings, wherein.

DETAILED DESCRIPTION

The invention relates to a method for preparing and disposing of a fluid, with particular application to a used drilling fluid or drilling cut, wherein the fluid is disposed of by displacement injection or pumping through a well into a shallow saturated soil formation with relatively low complicity. As will be further discussed below, such pumping, when carried out utilizing fluid having the appropriate viscosity and at suitable pumping rates, readily displaces saturated soil from the point of introduction into the formation so as to form a bulb into which the fluid is pumped. Further, it is believed that displacement of the saturated soil away from the fluid zone creates a local zone around the fluid zone where pore water pressure is at an elevated level, typically higher than the fluid within the fluid zone, such that flow is established through the saturated soil in a direction from the high-pressure local zone toward the fluid zone, thereby discouraging escape of fluid from the fluid zone.

As used herein, the term "fluid" relates to any flowable matter including slurries and the like which may be disposed of in accordance with the present invention. The following description is given in terms of disposal of a used drilling fluid. Of course, other slurries and the like could readily be disposed of utilizing the same method, and the term "fluid" is intended as used herein to include all such flowable materials to be disposed of.

Various types of saturated soils are suitable for use in disposal of fluid in accordance with the present invention. Clay formations, and particularly saturated clay formations, constitute one particularly well suited type of environment for application of the method in accordance with the invention.

Figure 1:
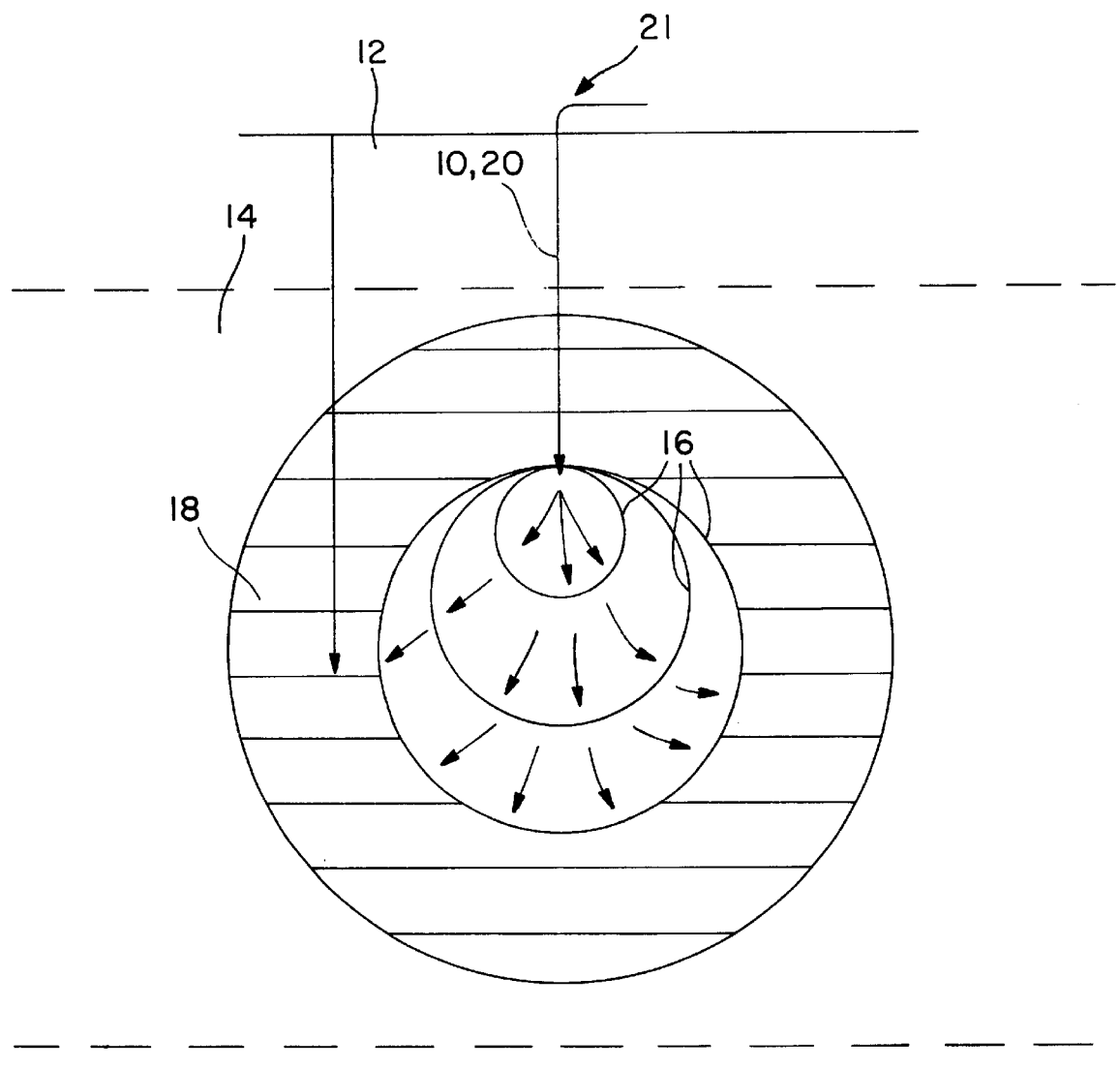
FIG. 1 schematically illustrates disposal of a fluid in accordance with the present invention.

FIG. 1 shows a schematic illustration of a well 10 drilled from a surface level 12 to a soil formation 14. Well 10 can be drilled utilizing various known techniques and equipment, and formation 14 is preferably selected in advance as being a saturated soil formation with relatively low compacity which can accept the fluid to be disposed of at a depth of less than or equal to about 100 meters. As shown in FIG. 1, once the formation has been reached at a desired depth, fluid is injected through well 10 and into formation 14 such that a fluid zone 16 forms and begins to expand, all the while displacing saturated soil away from zone 16 and forming a zone 18 of saturated soil which has been compressed, or displaced, by the formation of zone 16, and thereby has increased pore water pressure.

In accordance with the present invention, it is believed that the pore water pressure in zone 18 is sufficiently high, and preferably higher than the pressure of fluid within zone 16, that flow of fluid will be from zone 18 into zone 16, thereby discouraging escape of fluid from zone 16 as desired. Further, selection of saturated soil for the present disposal is desirable in that saturated soil has some plasticity and low permeability in order to discourage loss of fluid from zone 16, and saturated soil is sufficiently soft/loose that zone 16 can be formed without excessive pressure.

Figure 2:
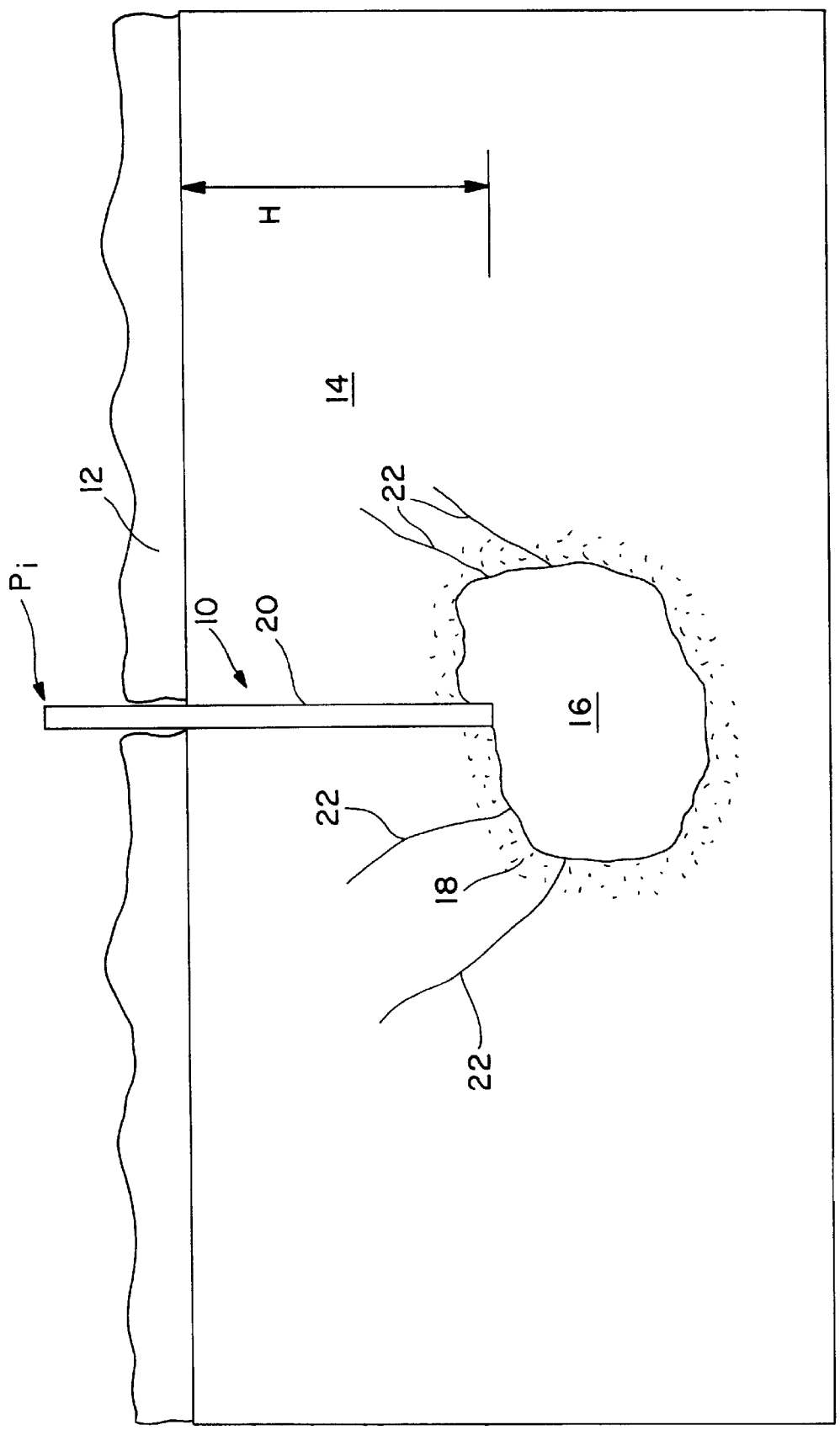
FIG. 2 further schematically illustrates a fluid disposed in a displaced fluid zone or bulb in a subterranean formation.

Turning to FIG. 2, a zone 16 is shown having been formed in formation 14 at a depth H. As set forth above, this depth H may be less than or equal to about 100 meters where suitable low compacity soils are located. Once zone 16 is sufficiently formed, it is desirable to seal well 10, and thereby seal fluid within zone 16. Sealing of well 10 can be carried out by capping, cementing, or any other method for effectively closing off well 10 in accordance with the present invention. In some instances it may be desirable to position a pipe 20 (also schematically illustrated in FIG. 1) in well 10, for example prior to pumping of fluid, so as to insure expansion of zone 16 at the desired position. Pipe 20 can be cemented in place or capped or both.

During the course of pumping fluid into zone 16, it has been found that some discontinuities 22 may extend from zone 16 in various directions, including toward the surface level. However, such discontinuities do not interfere with containment of fluid within zone 16 since the viscosity of such fluid prevents flow through discontinuities toward the surface.

It may also be desirable to monitor pressure, for example within zone 16 or at an elbow 21 of pipe 20, during pumping so as to detect when a discontinuity 22 may have reached the surface, and/or any other change in pressure which may warrant investigation.

Also as shown, depending upon the nature of the soil, fluid and pumping rate, zone 16 will form in the shape of an eclipse emanating from the base of well 10, or may be roughly spherical.

Figure 3:
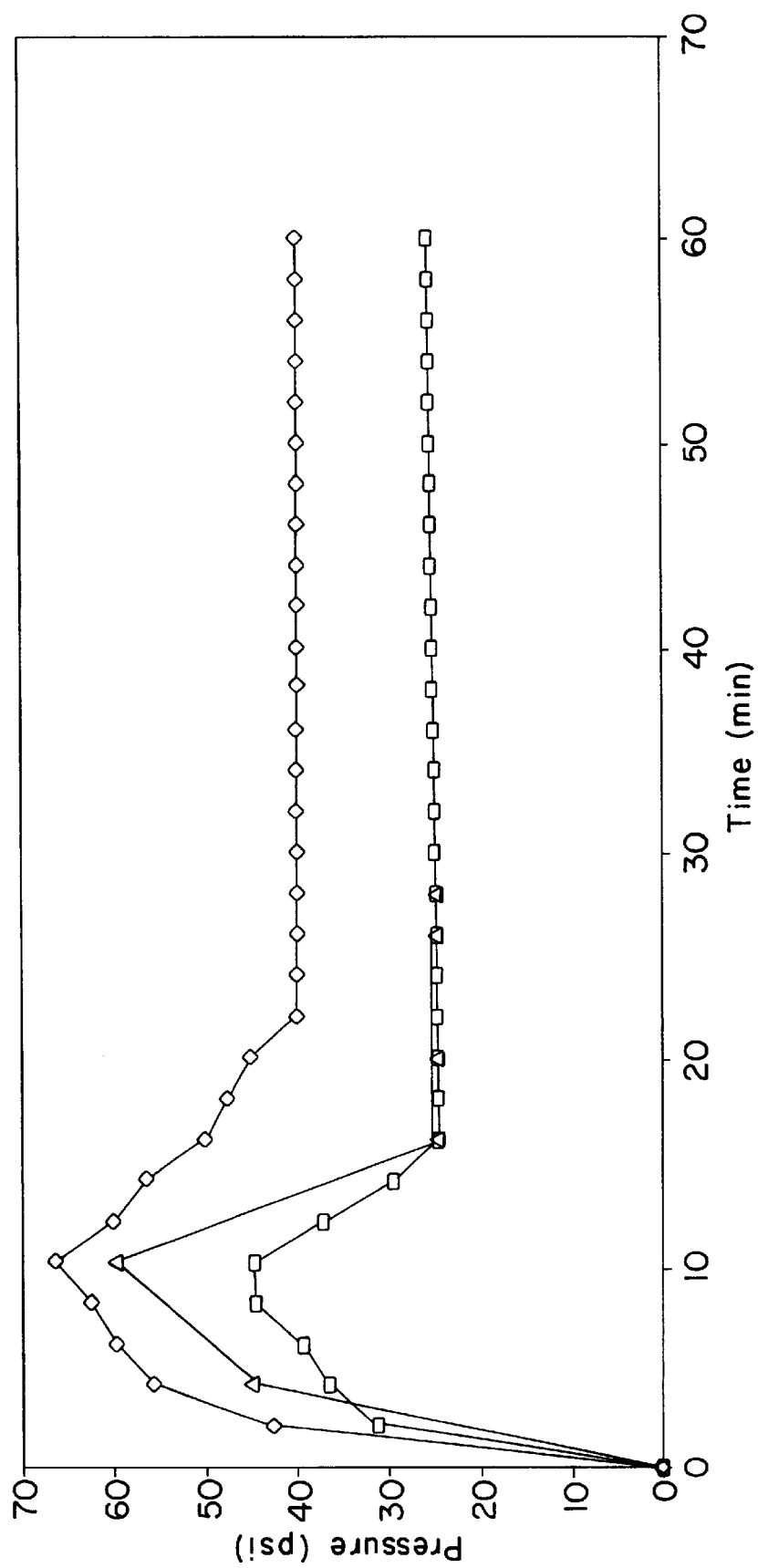
FIG. 3 illustrates pumping pressure over time in connection with predicted ranges and observed values while carrying out the method of the present invention.

Turning to FIG. 3, the relation is shown between pumping pressure (psi) and pumping time (min), and shows that during pumping of fluid into saturated soil formations, pressure gradually builds to a maximum point, and then drops. This drop in pressure has been found to occur when discontinuities reach ground surface level. Thus, in accordance with the present invention, it is preferred to monitor pressure during pumping, and continue pumping while the pressure either increases, decreases or remains constant within expected ranges such as in FIG. 3. If pressure shows certain pressure conditions such as a radical variation or the like, pumping can be stopped and fluid properties checked before continuing.

In accordance with the present invention, it is preferred that the saturated soil formation with relatively low compacity be selected so as to be below the water level in that area, which provides for such soils being readily displaced by injected fluid at reasonable pressures and pumping rates. In this regard, once a suitable formation is located, the formation is preferably evaluated so as to determine the viscosity of fluid to be disposed of which is appropriate for forming the desired fluid zone 16. In this regard, it may be desirable to adjust viscosity of the fluid to be disposed of so as to be more suitable with the particular conditions of the saturated soil disposal site. Viscosity of the fluid can be modified utilizing various known additives for accomplishing same, which additives are well known to a person of ordinary skill in the art. Of course, core samples can be taken while drilling to the soil formation to allow for evaluation of the soil profile so as to select appropriate depth and viscosity.

The low permeability of the saturated soil provides for a very stable disposal site which can maintain integrity for potentially unlimited periods of time. Thus, the method of the present invention is suitable for disposal of a wide variety of materials which are allowed to be disposed of and further can be utilized to dispose of these materials in sensitive areas thereby avoiding the need for transporting drilling cuts to other suitable areas for disposal.

Of course, since the fluid is to be disposed of in an underground location, the method of the present invention is most preferably suited for use in disposing materials which pose no threat to the environment and are allowed to be disposed of as a fluid without any other physical requirement different from positioning in a bulb in a soil mass.

In accordance with the present invention, it has been found that ideal results are obtained utilizing a fluid which reaches a viscosity greater than 100,000 cps or sets after pumping. This advantageously serves to help maintain the fluid stored in the fluid zone or bulb as desired.

It is further preferred in accordance with the present invention that precautions be taken to insure that the pipe and any other work for closing off zone 16 will remain in place after disposal of the fluid. Thus, and as further illustrated in FIG. 2, the force holding the pipe in place is preferably evaluated and adapted so as to be greater than the force which would serve to displace same. In order to determine the force holding the pipe in place, it is desirable to evaluate the adherence of the pipe to surrounding soil or other formation materials to establish the need of any additional anchoring structure. This should be evaluated as against the force generated by pressure within zone 16 upon exposed portions of pipe 20 as well with conventional methods used in civil engineering calculations. Of course, density adjusting steps and the like can be taken, if necessary, so as to insure sufficient holding force for keeping the pipe in place during pumping.

In accordance with the foregoing, it should be readily appreciated that a method has been provided for safely and effectively disposing of fluids, which method advantageously allows for disposal in shallow saturated soil formations with relatively low compacity which are very common and easily located, and which allows for disposal in potentially sensitive areas, utilizing a minimal amount of equipment and thereby incurring minimal expense, while avoiding the potential need for costly transport of materials to be disposed of to potentially distant areas for conventional disposal.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for disposing of a fluid, comprising the steps of:

selecting a saturated soil formation having a desired compacity;

obtaining a fluid having a viscosity;

ensuring said fluid viscosity is a viscosity sufficient for displacing said selected saturated soil formation;

positioning a well into the saturated soil formation;

pumping said fluid into said well whereby said fluid displaces saturated soil away from aid well so as to form a pore water pressure zone of compressed soil around a fluid zone in said saturated soil for storing said fluid wherein the pore water pressure zone is characterized by a permeability which discourages loss of fluid from the fluid zone; and monitoring fluid pressure during said pumping step whereby said pumping step can be stopped upon detection of certain pressure conditions.

2. The method according to claim 1, wherein said positioning step comprises positioning said well to said saturated soil at a depth from surface of less than about 100 meters.

3. The method according to claim 1, wherein said fluid reaches a viscosity greater than 100,000 cps after pumping.

4. The method according to claim 1, wherein said fluid sets after pumping.

5. The method of claim 1, further comprising the step of sealing said well after said pumping step so as to seal said fluid in said fluid zone.

* * * * *